United States Patent [19]

Shaw et al.

[11] 3,948,089

[45] Apr. 6, 1976

[54] STRAIN GAUGE APPARATUS

[75] Inventors: Bevil J. Shaw, Murrysville; John deKlerk, Pittsburgh, both of Pa.

[73] Assignee: Westinghouse Electric Corporation, Pittsburgh, Pa.

[22] Filed: Oct. 12, 1973

[21] Appl. No.: 405,942

[52] U.S. Cl............. 73/88.5 R; 73/DIG. 4; 310/9.7; 310/8.3; 310/8.1
[51] Int. Cl.².......................................... G01B 7/16
[58] Field of Search..... 73/88.5 R, 88.5 SD, DIG. 4; 310/9.2, 9.3, 9.6, 9.7, 8.3, 8.1; 29/25.35

[56] References Cited
UNITED STATES PATENTS

| | | | |
|---|---|---|---|
| 2,486,968 | 11/1949 | Moulton | 310/8.3 |
| 2,558,563 | 6/1951 | Janssen | 73/88.5 |
| 2,715,666 | 8/1955 | Stinchfield | 73/88.5 R |
| 2,898,477 | 7/1959 | Hoesterey | 73/DIG. 4 |
| 3,093,760 | 6/1963 | Tarasevich | 73/88.5 R |
| 3,137,834 | 6/1964 | Pfann | 73/88.5 SD |
| 3,314,034 | 4/1967 | Caris | 73/88.5 SD |
| 3,469,120 | 9/1969 | Nagao et al. | 310/8.5 |
| 3,588,552 | 6/1971 | Schafft | 310/9.6 |

FOREIGN PATENTS OR APPLICATIONS

| | | | |
|---|---|---|---|
| 1,027,735 | 4/1958 | Germany | 310/8.2 |

OTHER PUBLICATIONS

J. de Klerk, "Thin Film Zinc Oxide Transducers for use in Microwave Devices," *Ultrasonics*, July 1970, pp. 159–164.

*Primary Examiner*—James J. Gill
*Assistant Examiner*—Anthony V. Ciarlante
*Attorney, Agent, or Firm*—R. G. Brodahl

[57] ABSTRACT

A specimen or in-service structural member in which strain is to be measured is fabricated as a unit which generates a signal in response to strain occurring in a given region of its surface. A film of piezoelectric material is deposited upon the surface in a manner providing a strong molecular bond between the specimen or member and the piezoelectric film. The film material is chosen from the class having a 6 mm type crystal lattice structure and is formed as a crystalline deposit with the c-axis perpendicular to the surface of the specimen or member. An arrangement of electrodes is provided for direct electrical coupling between spatially separated portions of the piezoelectric film. The electrodes form an output coupling for an electrical signal generated by the piezoelectrically active properties of the piezoelectric film in response to strain mechanically coupled from the substrate surface to the piezoelectric film through the molecular bond. In constructions in which there is a possibility of the electrode arrangement becoming short-circuited through minute vacancies present as imperfections in the piezoelectric film, an ultrathin film of insulating material is deposited adjacent one or the other sides of the piezoelectric film.

19 Claims, 16 Drawing Figures

STRAIN GAUGE APPARATUS

The invention herein described was made in the course of or under a contract with the Department of the Navy.

BACKGROUND OF THE INVENTION

This invention relates to strain gauging apparatus, and more particularly, to such apparatus having utility in connection with testing or monitoring for purposes of analysis employing advance metallurgical theorems, such as those concerned with propagation of cracks, twins and martensite transformations. In its broader aspects, the invention relates to microphony apparatus for generating electrical signals in response to strain, wave motion, or acoustic signals present at the surface of test specimens or in-service structural members.

Recent advances in metallurgical analysis have created a requirement for strain gauge apparatus, both for purposes of test and operational monitoring, which have higher sensitivity of strain response, faster time-frequency response characteristics, and better spatial resolution than heretofore available with conventional strain gauge apparatus. For most strain gauges, the strain sensitivity is limited to $10^{-5}$ in./in. Capacitance strain gauges have a sensitivity of $10^{-6}$ in./in. Most strain gauges are attached to the surface and rapid response is inhibited by the joining material. The smallest conventional strain gauge is the resistance gauge, which is about 1/16 inch in length. The capacitance strain gauge measure strains on an entire specimen.

The approach of using piezoelectric materials in the construction of strain gauge apparatus is known. One known effort has been to cement a thin slab of piezoelectric material to the specimen or structural member, using the bulk properties of piezoelectric materials. This approach involves limitations of sensitivity and time response characteristics, and therefore is not fruitful in significantly advancing strain sensitivity and time response capabilities beyond those of conventional strain gauge apparatuses.

Another known effort using piezoelectric materials has been to use a piezoelectric film deposit in a field effect transistor organization in a way in which the film is used as a semiconductor medium, and straining of the piezoelectric film produces a redistribution of charges along a gate element of the field effect transistor organization. The mode of causing the response by redistribution of charge along the gate element of that approach has limitations in linearity of resonse to strain. In addition, the field effect transistor organization is limited to use in measurements with non-metallic specimens or operational structural members. Further this device is an active device and therefore complicates the problem of instrumentation.

SUMMARY OF THE INVENTION

In strain gauge apparatus constructed according to this invention, the region of a surface of the specimen or operational structural member in which measurement of strain is desired is conventionally prepared as a substrate. A film of piezoelectric material having a class 6 mm crystal lattice structure is formed as a film layer over the substrate surface. An arrangement of electrodes to pick off piezoelectric signals generated by the piezoelectrically active properties of the film is provided. In those cases in which there is the possibility of a short circuit between the electrodes through minute vacancies present in the piezoelectric film as imperfections, an ultrathin film of insulating material is formed adjacent the inner or outer facee of the piezoelectric film to seal the vacancies. The manner of forming the piezoelectric film, and the insulating film (if any) is chosen to cause a molecular bond between the specimen material and the piezoelectric film and to cause the c-axis of the crystal lattice structure of the piezoelectric film to be normal to the substrate surface. A high degree of care is exercised in depositing the piezoelectric film to supress the formation of minute vacancies. The degree of suppression of such vacancies is indicated by the average resistance of the film in its thickness dimension. A typical thickness of piezoelectric film is 1.0 microns, and the typical thickness of an insulating film is 500 Angstroms (A). A typical average resistance of the film layer or layers is $10^9$ ohms. The pick-off electrode arrangements are chosen to pick off piezoelectric signals which are in response to strain which is mechanically coupled from the substrate to the film through the molecular bond. One such arrangement consists of conductors in confronting relationship across the thickness dimension of the piezoelectric film. This arrangement picks off piezoelectric responses from strain or waves acting in any compressional wave mode in a direction perpendicular to the substrate. Another such pick-off electrode arrangement consists of conductors directly coupled to a face of the piezoelectric film in spaced relationship in a direction parallel to the substrate surface. This arrangement picks off piezoelectric signals responsive to strains or wave motion mechanically coupled from the specimen to the film in a shear wave mode in a direction parallel to the plane of the substrate. Shielding of leads and of the general area of the specimen (by a Faraday cage) is provided. This apparatus generates signal values which can respond to strains in the $10^{-8}$ in./in. (or m/m) to $10^{-4}$ in./in. (or m/m) range, with a time response which is virtually unlimited for transients on the high frequency end, but limited to a lower film strain rate of approximately 0.001 in./in./min. (or $1.667.10^{-4}$ m/m/s). By use of miniaturized construction of the pick-off electrode arrangements, it is possible to monitor strains from points very close to one another.

DESCRIPTION OF THE PREFERRED EMBODIMENT

Figure 1:
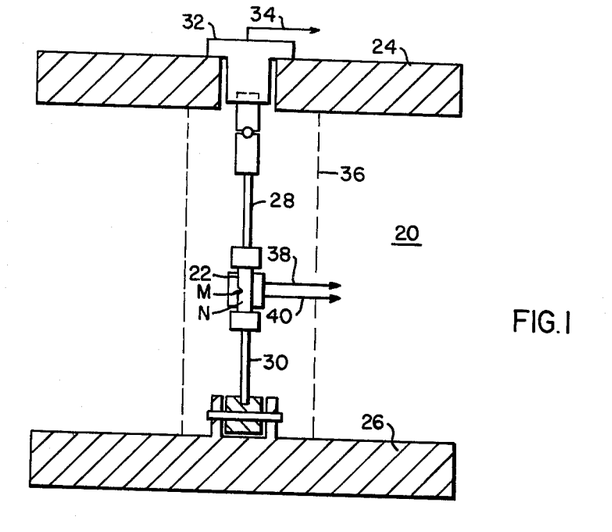
FIG. 1 is a side elevation, partly in section, of an organization for performance of tensile strain tests employing the present invention.

Referring now to the drawings, and in particular to FIG. 1, the subject matter of the invention will be illustrated in connection with apparatus 20, which is an organization for performing tensile tests upon a notched specimen and signal strain pick-off unit 22. The body member 23 of unit 22 is a piece of metal of the conventional size and shape for tensile tests known as a "1-inch specimen". (This term is derived from the fact that the "gauge portion" of the specimen, which is its expanse between the enlarged "grip" portions at its ends is 1.0 inches, or $2.54.10^{-2}$m, in length.) Unit 22 has, as an integral part thereof, a structure for picking off electric signals representative of strain appearing at a monitoring point M adjacent the bottom of the notch and representative of strain at another monitoring point N located at a position away from the notch. In the illustrative example of this description, the specimen material out of which body member 23 is made is the metal molybdenum. The tensile strain is applied by a conventional tensile test machine including an upper rigid support 24 and a lower movable ram 26 which moves downward during application of the strain. The upper and lower extremities of the specimen are grasped by grip elements of an upper tie rod 28 and a lower tie rod 30, respectively. Upper tie rod 28 is mechanically coupled to rigid support 24 through a universal joint and through a conventional load cell 32. Lower tie rod 30 is mechanically coupled to the movable ram 26 through a pin joint. The load cell 32 provides an electrical signal 34 which is a measure of the stress applied to specimen 22. The specimen and connector rods are surrounded by a Faraday cage 36. A coaxial wire 38 extends from a position adjacent specimen unit 22 out through the Faraday cage. Another coaxial wire 40 extends from another position adjacent specimen unit 22 out through the Faraday cage. Wires 38 and 40 are output couplings for signals representing the strain at monitoring points M and N, respectively. (The scale with which FIG. 1 shows specimen 22 is too small to show the details of the structure for picking off signals from monitoring points M and N and applying them to coaxial wires 38 and 40. These will be described in considerable detail in the remainder of the specification.) Faraday cage 36 has the purpose of shielding unit 22 and the signal pick-off structure from stray signals in the area of apparatus 20.

Figure 2:
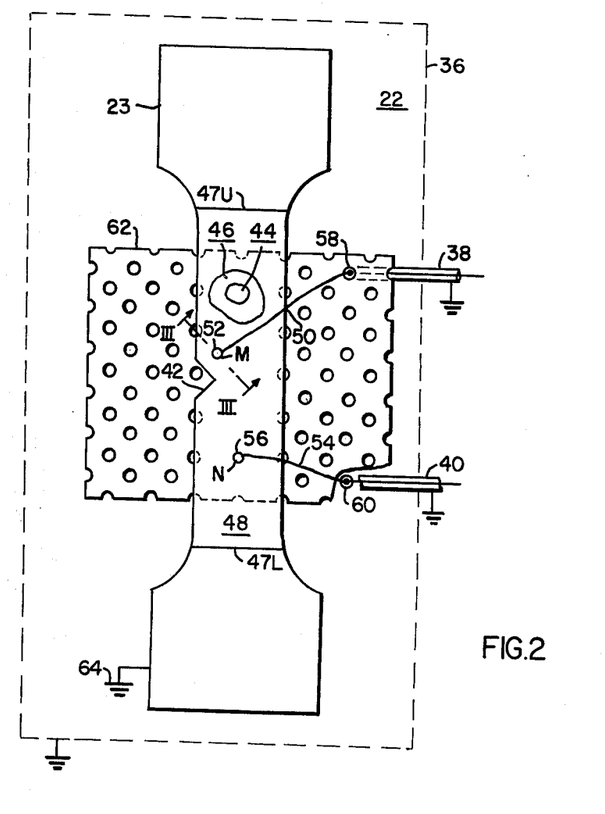
FIG. 2 is an enlarged side elevation of a component of FIG. 1.
Figures 3, 4, 5:
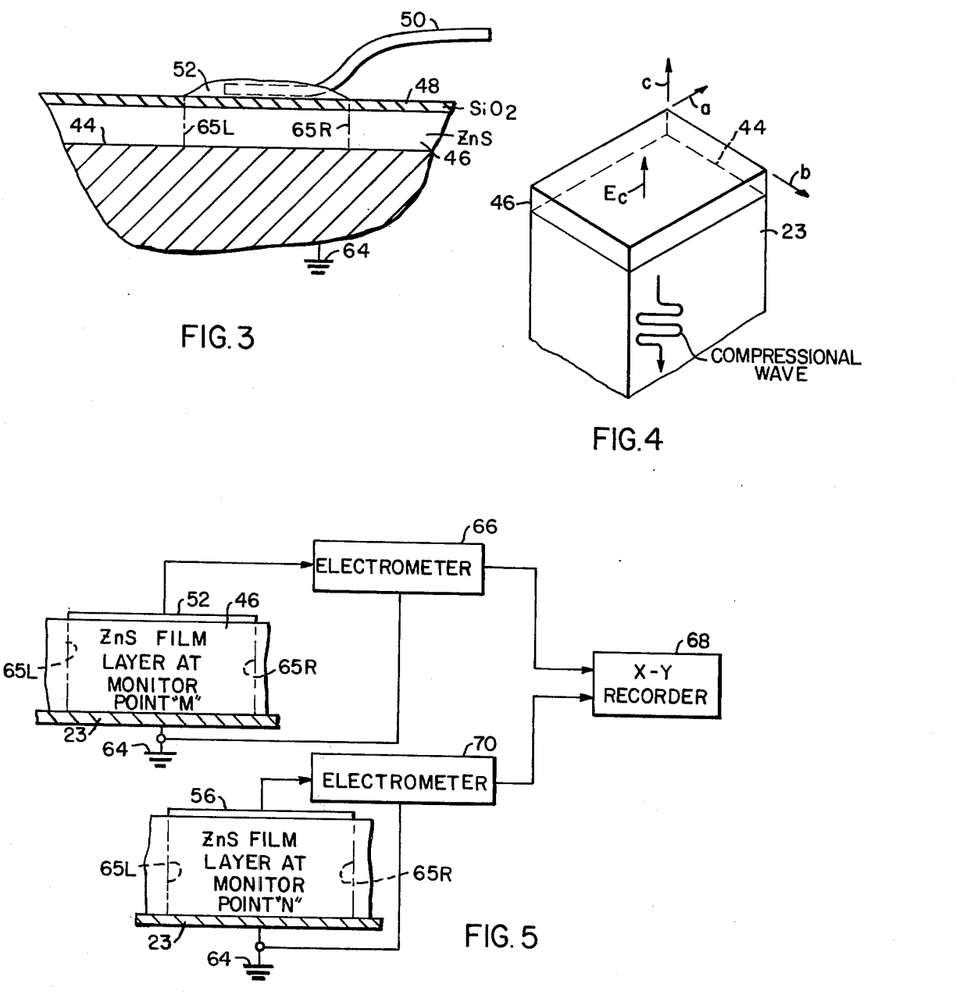
FIG. 3 is a section taken along lines III—III of FIG. 2, with the thickness dimensions of film layers greatly exaggerated to aid in the description.
FIG. 4 is a diagrammatic illustrating certain crystal structure and piezoelectricity cooperations present in the embodiment of FIGS. 2 and 3.
FIG. 5 is a block diagram showing instrumentation circuitry associated with the organization of FIG. 1.

Reference is now made to FIGS. 2 and 3 for purposes of description of the signal pick-off structure of unit 22 which could not be shown in the scale of FIG. 1. Body member 23 is made of flat stock of predetermined thickness. The notch 42 is formed in the left edge (as viewed in the drawing) midway between its ends. The front face (as viewed in the drawing) of the body member 23 is prepared as a substrate surface 44 adapted to receive the application thereon of a stratum of another material. The techniques for doing this are conventional, the purpose being to enable intimate molecular bonding between the strata deposited thereon with the body material of the specimen. Crystalline ZnS is deposited onto substrate 44 to form a piezoelectric film 46. The thickness of film 46 is 1 micron, and it extends over the face of the specimen bounded at the top by a film edge 47U where the width of the specimen starts to enlarge to form the upper grip portion, and bounded at the bottom by a lower film edge 47L where a corresponding lower enlargement of width starts. SiO is next deposited onto the outer face of film 46 to form an insulating film 48. The thickness of insulating film 48 is 500 Angstroms (i.e. it is about 1/20th of a micron in thickness), and its expanse is coextensive with the piezoelectric film 46. Alternative materials for piezoelectric films 46 include the various piezoelectric materials having a class 6 mm crystal structure, such as ZnO, CdS, and AlN. $SiO_2$ is a suitable alternative material for insulating film 48. The insulating film 48 is applied, in an amorphorous form, and not as a crystalline material.

Reference is now made to FIG. 4 for a description of the crystallographic characteristics of piezoelectric film 46. The lattice structure of crystals of ZnS is of the 6 mm type according to the International system of defining crystal structures. The crystallographic and piezoelectric properties depicted in FIG. 4 are defined by the conventions of the Bravais system of axes consisting of orthogonally related a, b and c axes. The process by which the deposit of ZnS forming film 46 is applied to substrate surface 44 is so chosen that ZnS is deposited thereon in crystalline form with the c-axis of the crystal structure normal to surface 44. It is an inherent property of such a deposit that a very strong molecular bond exists between film 46 and the body material of specimen unit 22.

Certain other characteristics of films 46 and 48 have been found important to operability and to successful production of a film. The formulation of pinholes or vacancies in the film should be suppressed to a high degree. A figure of merit which represents the degree of presence of pinholes in film 46 is the measure of resistance level along the film, which is obtained by averaging resistance measurements taken at many points on the surface of the film. For magnitudes of strain rates conventional to the performance of tests with 1-inch specimens, it is essential to have resistance levels of the order of $10^9$ ohms. Also, it has been found that the piezoelectric film 46 should be in the thickness range of 1.5 microns, or under, for convenience in application. Any thickness above 1.5 microns tends to craze under the coefficient of expansion and temperature relationships connected with start-of-the-art processes for applying the film to the substrate. The deposit of SiO should be ultrapure in chemical composition. For best results it is preferable that the SiO vapor be "pinned" between high voltage plates prior to deposition.

The vapor deposition technique described in U.S. Pat. No. 3,632,439 to John DeKlerk entitled "Method of Forming Thin Insulating Films Particularly for Piezoelectric Transducer" has been found effective in forming a film having the desired crystallographic orientation and high pinhole resistance, and also in forming a pure SiO film. Other state-of-the-art processes which could be used include sputtering and reactive evaporation. Where the films are to be applied to a large part, such as to working members of mechanical equipment and structures, the technique of sputtering is more convenient because it can accommodate larger work pieces. For a detailed description of a technique for sputtering AlN films onto a substrate at room temperature see A. J. Noreika and M. H. Francombe and S. A. Zietman, Journal of Vacuum Science Technology 6, 194 (1969).

Again referring to FIGS. 2 and 3, an end of a gold wire 50 is affixed to the outer face of insulating layer 48 at monitoring position M by a tiny deposit 52 of silver epoxy glue. Deposit 52 is made small in order to localize the sensing of strain at the monitoring point M, as will be better understood later in this description. The size of the deposit can be made very small by use of a hypodermic syringe in its application. The end of another gold wire 54 (FIG. 2, only) is similarly affixed over monitoring point N by another silver epoxy glue deposit 56. Since the insulating film 48 is ultra-thin (500 A) the amount of resistance which film 48 represents between the silver epoxy glue deposits 52 and 56 and the piezoelectric film 46 is not appreciable in considering a series circuit between the conductive deposit and the piezoelectric film. For practical purposes the deposits 52 and 56 are in a direct electric contact coupling relationship to the piezoelectric film 46. However, this ultra-thin insulating film 48 "seals" or "plugs" any pinholes or vacancies in film 46 and therefore obviates the formation of a short circuit between the deposit 52 and the body member 23 which could be caused by conductive glue filling the pinholes. The application of insulating film 48 has been found to reduce the incidence of rejection of specimen units from a 50 percent rate of rejection (found to exist where no insulating film is used) to a negligible percentage when constructed as described. The electrical connection of the other ends of gold wires 50 and 54 to coaxial wires 38 and 40 is facilitated in any suitable manner. The particular arrangement shown in FIG. 2 includes provision of a pair of terminal pins 58 and 60 projecting through perforated terminal pin mounting stock 62, which in turn is secured to the rear face of specimen unit 22 by adhesive tape (not shown). Gold wires 50 and 54 are connected to the end of the pins projecting from the front side (as shown in the drawing) of the terminal pin mounting stock, and the center conductors of coaxial wires 38 and 40 are connected to the pin ends projecting from the rear side. The body of test specimen 22 is returned to electrical ground by a suitable ground connection 64. The outer conductors of coaxial wires 38 and 40, and the Faraday cage 36 are returned to ground, too.

Reference is now made to FIGS. 3 and 4 taken together to describe what is believed to be the mode of operation of the film and electric contact structure thus far described. A piezoelectric potential $E_c$ is generated along the c-axis of the crystal structure when the piezoelectric film is subjected to strain or wave motion having a component acting in a tensile or compressional wave mode in the direction of the c-axis. Deposit 52 and the confronting portion of the body member 23 form a pair of electrodes, and the potential which is generated within the portion of the piezoelectric film therebetween appears as a signal relative to ground carried by gold wire 50. Phantom lines 65L and 65R symbolically depict the boundries of the portion of the piezoelectric film which is the source of piezoelectric signal which appears between the confronting electrodes. The deposit 56 at monitoring point N is likewise operative to pick up the signal generated in a corresponding region of film 46 at point N.

Reference is now made to FIG. 5, showing the instrumentation and circuitry provided to record the strain values represented by the signals picked off at points M and N. The piezoelectric signal picked up at point M between deposit 52 and the body of the specimen is applied to an electrometer 66, which in turn applies a corresponding electric voltage as one of the inputs to the y-axis of an x-y recorder 68. Similarly, the signal from across the electrodes at point N is coupled to another electrometer 70, which in turn is applied as another input to the y-axis of recorder 68. The time base of the tensile test run is indicated on the X-axis of recorder 68. A cathode ray output device or tape device may be substituted for the x-y recorder for tests involving higher magnitudes of strain rate.

Figure 6:
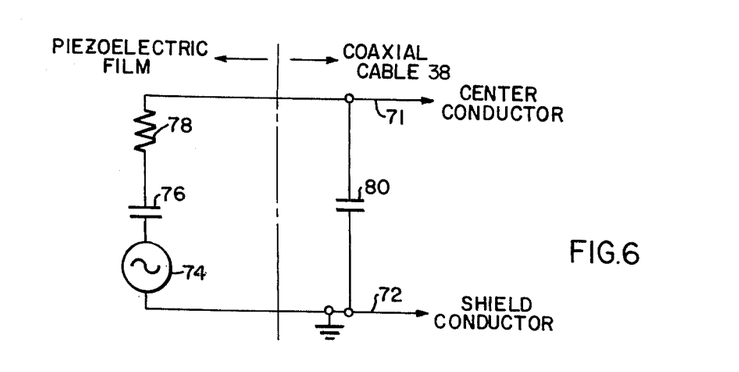
FIG. 6 is a circuit diagram representing an equivalent circuit of certain electrical cooperations believed present in the embodiment of FIGS. 2 and 3.

FIG. 6 shows what is believed the equivalent electrical circuit of the piezoelectric signal pick-off structure for point M. To the coaxial cable 38, the piezoelectric signal between the contact 52 and body member 23 (best shown in FIGS. 3 and 5) appears as a series circuit comprising a signal generator 74, an equivalent capacitor 76 representing the capacitance of the film, and an equivalent resistor 78 representing internal or radiation resistance of the film. To the piezoelectric film, the center conductor 71 of the coaxial cable and the shield wire 72 of the coaxial cable appear as two conductors with an equivalent capacitor 80, representing the capacitance of the coaxial cable shunt connected thereacross.

Figure 7:
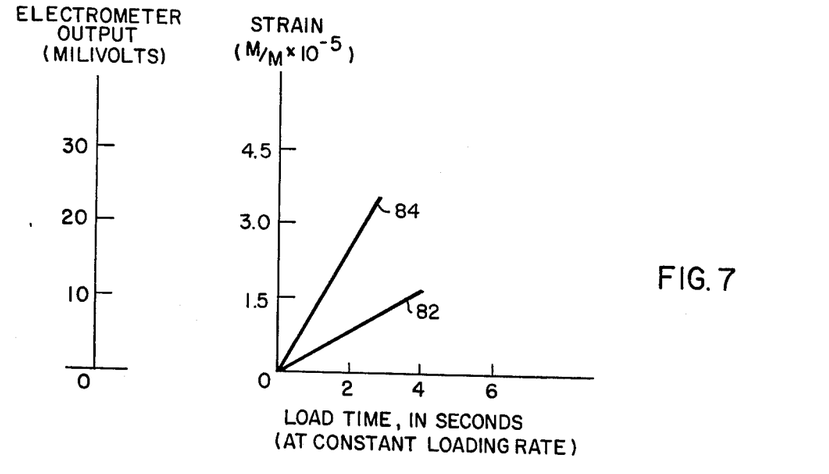
FIG. 7 is a graph of curves obtained in the operation of the organization of FIG. 1.

FIG. 7 shows response curves 82 and 84 which are typical of the kind produced by x-y recorder 68, FIG. 5 when specimen unit 22 is subjected to test. Curve 82 is the response from contact 56 at monitoring point N, and curve 84 is the response from contact 52 at monitoring point M. Prior to the running of the actual test, the voltage response from piezoelectric film 46 is calibrated using monitoring point N, or any similar point which represents the strain from the bulk material of specimen 22 and not the strain from the region of a notch. The strain values for given electrical values are derived using output 34 of load cell 32, FIG. 1.

One requirement for effective calibration is that the loading of the specimen during calibration be done with a magnitude of strain rate which is sufficient to avoid undesired effects of piezoelectric charge decay in film 46. This reason for this requirement will be better understood from the following discussion made with reference to FIG. 8. Curve 85 therein depicts strain as a function of time for a given specimen, and curve 86 depicts voltage response as a function of time during such loading of the specimen. The portion of curve 85 extending from its starting point 87a to point 87b represents loading to some arbitrary stress represented by the ordinal value of point 87b. The specimen is then held at a constant strain for a certain time corresponding to the curve segment between points 87b and 87c.

Figure 8:
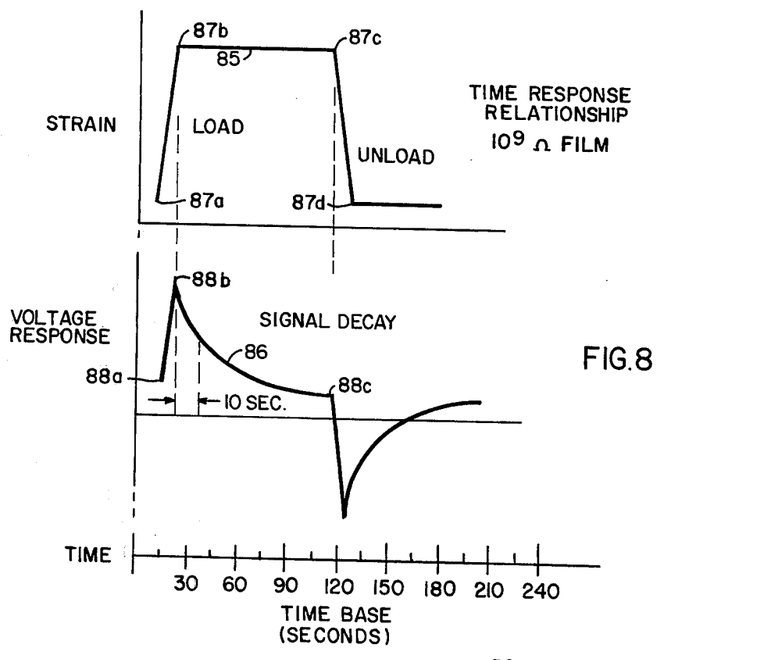
FIG. 8 is a set of curves which aid in the explanation of the present invention.

The voltage response generated at monitoring point N in response to the loading change from point 87a to 87b is the segment of curve 86 between points 88a and 88b. It is to be understood that the ordinal value at the origin of curve 88 is not zero. Instead it is a voltage value related to the charging of the piezoelectric film. Calibration is in fact the change of a voltage for a given change in strain. Theoretically, if the film were absolutely perfect there would be no voltage decay on the piezoelectric film over the time between points 87a and 87b. In fact, the charge decays due to the film resistance not being infinite. This effect is due to the charge on the surface of the film redistributing itself. It has been experimentally found that the voltage response typically decays as shown by the segment of curve 86 between points 88b and 88c. For films with a resistance of the order $10^9$ ohms, a decay to half the original level at point 88b takes place over a period of time of the order of 10 seconds. From the foregoing, it will be apparent that the magnitude of strain rate to calibrate the voltage response from the piezoelectric film 46 must be sufficiently large to avoid the effects of the charge flowing away from the film as a function of time. A typical magnitude of strain rate which has been found satisfactory is 0.01 in./in./min. ($1.667 \cdot 10^{-4}$ m/m/s).

Assume then that the voltage response from piezoelectric film 46 on specimen 22 has been calibrated as represented by the graduated scale along the ordinal axis of FIG. 7. Curve 84 represents the measured strain occurring at monitoring point M adjacent the bottom of notch 42 when specimen 22 is loaded at a magnitude of strain rate which is conventional in the performance of tests with 1-inch specimens. Curve 82 is the same measurement taken from monitoring point N. Comparison of the two curves permits detailed study of strain behavior at notches or cracks in the material. In particular, a higher strain for a given load on the specimen is indicated at point M then at point N.

As will be appreciated by those skilled in the art of construction of miniaturized circuitry employing deposited gold film conductor elements, it is possible to implement picking off a piezoelectric signal from across the thickness dimension of the piezoelectric film in a highly localized region as follows (not shown in the drawing). A thick layer of insulating material is deposited onto the outer face of the piezoelectric layer structure, except in "masked out" areas corresponding to the desired contact areas. Then a gold film is deposited onto the electrode areas, and the signal is coupled to a suitable terminal arrangement by gold film leads formed integrally with the electrode areas and over the thick insulating layer.

The advantages of the piezoelectric film devices for strain measurement will now be understood in light of what has been thus far described. The present apparatus provides three aspects of improved sensitivity which cannot be achieved with prior art strain gages.

Firstly, strains may be measured at any number of points in closely juxtaposed positions on a specimen. This is possible because the construction of contacts 52 and 56 of the tiny deposits of silver epoxy glue enable picking off a signal which is localized to the region approximately underneath the deposit. Any number of these points can be placed on a specimen, and with the only limit on closeness being that they are not in physical contact with one another.

Secondly, strains of the order of $10^{-8}$ in./in. (or m/m) have been measured with specimen and strain signal unit construction having a ZnS film, but this kind of measurement is only possible if background noise is eliminated. The sensitivity of conventional strain gauges is of the order of $10^{-6}$ ins./ins. (or m/m), so that this construction achieves a sensitivity which is two orders of magnitude better than that of conventional strain gauges. ZnO films have a greater response than ZnS, and based upon analysis it is believed that strains of $10^{-10}$ in./in. (or m/m) could be measured using ZnO films.

Thirdly, it can be theoretically demonstrated, and has been experimentally confirmed that specimen and signal generator unit 22 has extremely fast time response characteristics. This characteristics relates to the intimacy of the bond of the piezoelectric film to the substrate. The nature of the bonding present in the described structure enables the apparatus to respond to signals in the nanosecond ($10^{-9}$s) range. Also, due to the ultra thinness of the film the present apparatus will not have undesired resonant frequency characteristics which are present in some of the prior art approaches. Stated another way, the present apparatus has extremely high frequency-time response characteristics which gives it more reliable and faithful responses to strains, including acoustic strains. An example of a type of metallurgical application in which high frequency response is necessary, is the study of cracks, twins and martensite transformations. The theoretical maximum velocity at which these effects propagate is the velocity of sound in the metal, which is well within the response time of the piezoelectric film construction. The capability to measure strains at closely juxtaposed positions is also important in the study of cracks, twins and martensite transformations where it is desirable to instrument a specimen so that propagation of these effects in the area of a notch is monitored.

As has been stated, the intimacy of the molecular bonding between the piezoelectric film and the specimen is believed important in achieving the second and third mentioned sensitivity advantages. Another feature of the described construction which is believed important in achieving these sensitivities is the orientation of the c-axis of the piezoelectric crystalline structure at right angles to the substrate. Without the c-axis at right angles to the substrate the piezoelectric response cannot and will not respond linearly to strain. It is almost a natural consequence of the deposit of stoichiometrically pure materials having a 6 mm type crystal class that the c-axis is indeed at right angles to the substrate.

The previously described effect of signal decay results in a limitation in the application of the present invention to situations of slow strain rates. As hereinbefore stated, for a ZnS + SiO film with a resistance greater than $10^9$ ohms, the time for a signal to decay to half of its maximum is of the order of 10 seconds. For a film with a resistance of approximately $10^6$ ohms, little or no signal could be recorded for strain rates up to 0.1 ins./ins./min. As hereinbefore stated, the film resistance is an indication of the quality of the film and contact. Either a flaw in the film or a contact which shorted the film would lead to resistances of $10^6$ ohms or less. For high frequency stresses the low resistance film may be used, but for conventional tensile strain rates used with 1-inch specimens it is essential to have a resistance of $10^9$ ohms or greater.

Using a $10^9$ ohm ZnS film for small strains (in the elastic range) of the order of $4.25.10^{-5}$ in./in. (or $4.25.10^{-5}$ m/m) the response was found to be 0.03 volts at a strain rate of 0.06 in./in./min. (or $1.0.10^{-3}$ m/m/sec) and 0.016 volts at a strain rate of 0.006 in./in./min. ($1.0.10^{-4}$ m/m/sec.).

Figure 9:
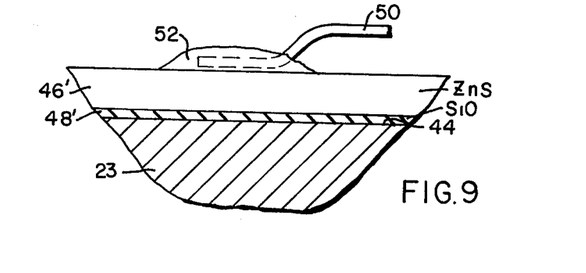
FIG. 9 is a section, similar to that of FIG. 3, of a modification of invention.

FIG. 9 shows a modified structure of film layers. The insulating film 48' here is applied directly onto the substrate surface 44, and the piezoelectric film 46' is applied onto the insulating film. It has been found that this arrangement is just as effective as direct application of the piezoelectric film in achieving strain sensitivity and fast time response. It is an inherent property of the SiO deposit forming the insulating film 48' that such a film acts as a strong molecular bond between the body of specimen 22 and piezoelectric film 46'. This is due to the molecular lattice structure of SiO which provides inherently good bonding characteristics even though deposited in an amorphorous, rather than crystalline, form. Alternative materials for film 48' include $SiO_2$ and other insulator materials exhibiting hardness in the upper half of the mho scale. The insulating film 46' functions to obviate the formation of short circuits through pinholes in the piezoelectric film in the same way as previously described in connection with FIGS. 2 and 3.

Figures 10, 11, 12:
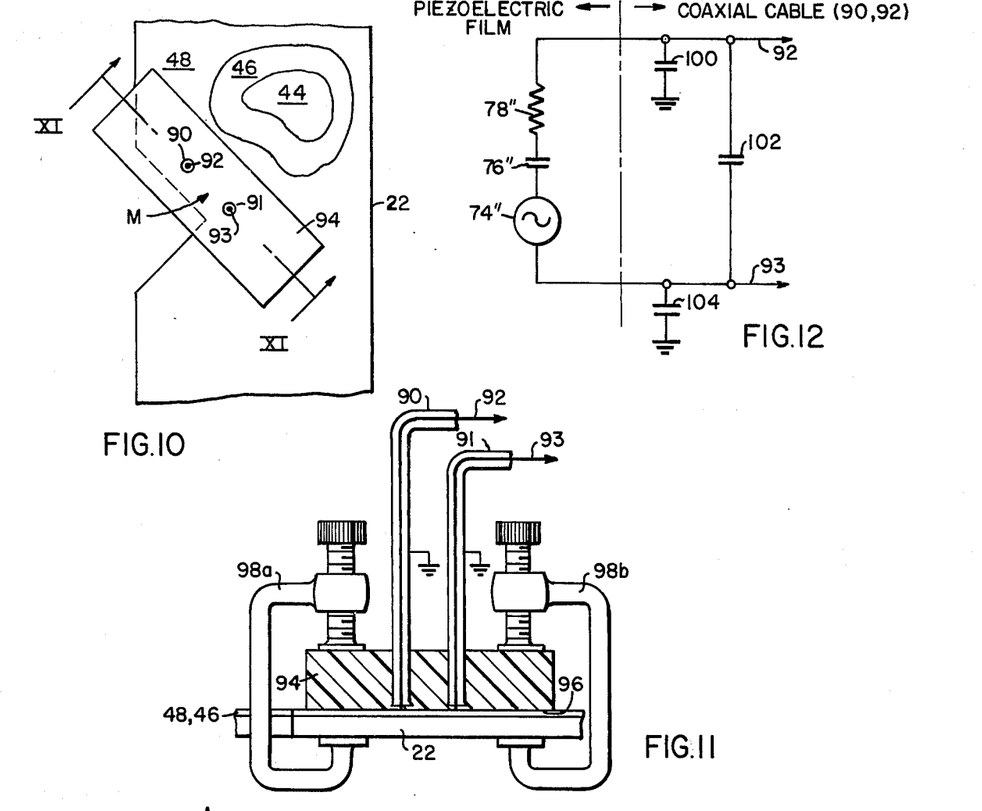
FIG. 10 is an enlarged detail, similar to that in FIG. 2, showing an alternate form of invention.
FIG. 11 is a section taken along lines XI—XI of FIG. 10 with the thickness dimensions of film layers greatly exaggerated to aid in description.
FIG. 12 is a circuit diagram representing an equivalent circuit of certain electrical cooperations believed present in the apparatus of FIGS. 10 and 11.

Reference will now be made to FIGS. 10 and 11 showing another alternative form of invention. The specimen unit 22 has exactly the same arrangement of a prepared substrate surface 44, a piezoelectric film 46, and an insulating film 48 as has been described in connection with FIGS. 2 and 3. However, in the alternate form of invention the strain signal in the region of point M is picked up by a unit consisting of a pair of coaxial cables 90 and 91 molded or potted in a block 94 of plastic insulating material. Cables 90 and 91 are molded in place with their respective center conductors 92 and 93 protruding a short distance beyond the shield conductors and emerging from the bottom face 96 of the block which has been polished to an extremely fine finish. The block is placed over the piezoelectric and insulating film construction. (Due to difficulties in showing the ultra-thin insulating material in scale, both the piezoelectric film 46 and an insulating film 48 are represented in FIG. 11 by a single layer.) The emergent center conductors 92 and 93 are pressed against the film layers on specimen 22 by any suitable manner of applying pressure. The illustrative mechanism for applying such pressure shown in FIG. 11 is the pair of G-clamps 98a, 98b. Block 94 is positioned with its coaxial wires 90 and 91 astride the monitoring point M. The potential generated between the two points at which center wires 92 and 93 contact the film structure is coupled into an electrometer (not shown) of an instrumentation arrangement like that heretofore described in FIG. 5.

Figures 13, 14, 15, 16:
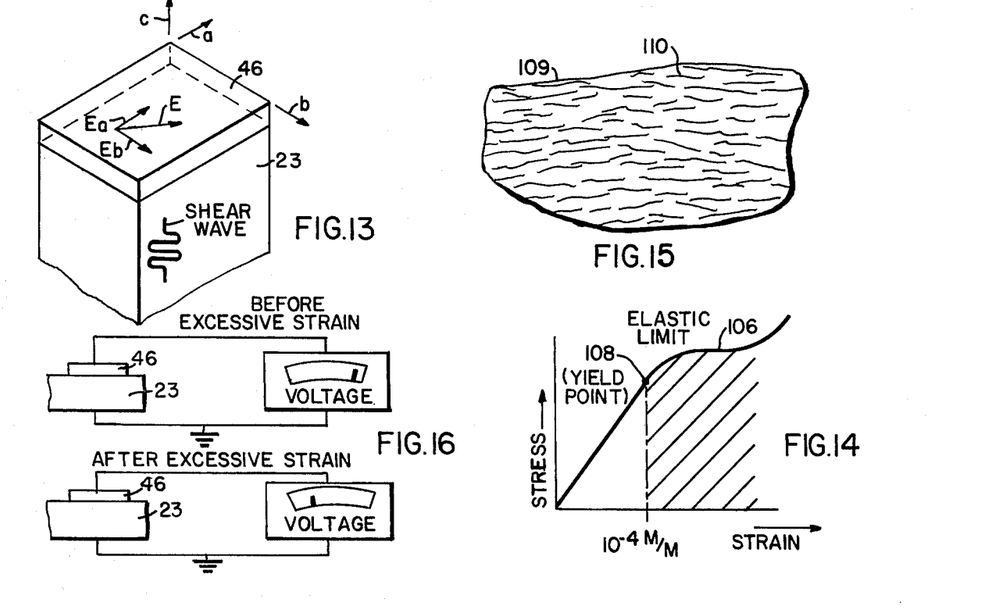
FIG. 13 is a diagrammatic illustrating certain crystal structure and piezoelectricity cooperations present in the embodiment of FIGS. 10 and 11.
FIG. 14 is a graph of a stress-strain curve which aids in describing the present invention.
FIG. 15 is a portion of a piezoelectric film layer after exposure to excessive strain, as observable in an optical microscope.
FIG. 16 is a diagrammatic showing electrical relationships exhibited by the apparatus of the present invention before and after excessive strain.

Reference is now made to FIG. 13 to describe what is believed to be the mode of operation of the wires 92 and 93 in picking off a piezoelectric signal in the region of monitoring point M. A piezoelectric signal E representing the vector addition of signal components along the a-axis and the b-axis is generated between spaced positions along piezoelectric film 46 when the film is subjected to strain or wave motion having a component acting in a shear wave mode in a direction parallel to the plane of the film.

FIG. 12 shows what is believed to be the equivalent electrical circuit of the alternate form of invention of FIGS. 10 and 11. To the center wires 92 and 93 of the coaxial cables, the piezoelectric film structure appears as a signal generator 74'', equivalent capacitor 76'' and equivalent resistor 78'' series connected thereacross. To the piezoelectric film, the center conductors 92 and 93 appear as though a part of a network including an equivalent capacitor 100 from ground to conductor 92, an equivalent capacitor 102 connected between center conductor 93 and center conductor 94, and an equivalent capacitor 104 connected between center conductor 93 and ground. Equivalent capacitors 100, and 104 represent the center conductor-to-shield capacitances of the two coaxial wires, and equivalent capacitor 102 represents the capacitance between center conductors 92 and 93 of FIG. 11.

While the illustrative embodiments which have been described have shown the piezoelectric film construction in conjunction with metal test specimens, the invention may be employed with non-metallic test specimens as well. The arrangement for picking off a piezoelectric signal and the desired region of a non-metallic specimen could take the form of the unit shown in FIGS. 10 and 11 consisting of the pair of spaced coaxial wires 90 and 92 molded into block 94 in the case of a non-metallic specimen. Alternatively, as will be appreciated by those skilled in the art of the construction of miniaturized circuitry employing deposited gold film conductor elements, it is possible that an arrangement of confronting electrodes across the thickness dimension of the piezoelectric film could be implemented by forming one of the electrodes as a deposit of a gold film between the non-metallic substrate and the piezoelectric film. The electrode on the outer surface could be of any suitable construction.

FIG. 14 shows a very typical load elongation curve 106, or implicitly a stress-strain curve, for a metal. Point 108 along the curve designates the yield point, or the elastic limit, of the metal. Beyond the elastic limit the material deforms plastically. At this level the piezoelectric film has been found to craze. Stated another way, if the piezoelectric film is strained beyond the elastic limit of the metal, then it will craze and form a pattern of minute cracks as shown in FIG. 15, which depicts a portion 109 of a piezoelectric film as it would appear in an optical microscope after crazing. The pattern of cracks in portion 109 consists of many individual cracks 110 within the film. It is implicit in the use of a piezoelectric film as a strain gauge signal source that it should not be used beyond the yield point of the substrate material (assuming it is a metal), or beyond a characteristic strain limit beyond which the piezoelectric film itself crazes. The latter limit has been found to be of the order $10^{-4}$ in./in. (or m/m). If the specimen is loaded beyond this point, then the voltage response from the piezoelectric film is markedly reduced. FIG. 16 shows schematically the observation of the voltage response prior to the film being crazed and after the film has been crazed. After excessive strain causes the film to craze the voltage response is reduced by a factor of approximately 10.

The reason for the voltage response being markedly reduced after the crazing of the film is as follows. Prior to the crazing the film stretches uniformly with the substrate material and gives a voltage response proportional to the strain of the substrate material. After crazing, the film no longer accurately follows the strain of the substrate material since the crazing or cracks themselves pull apart rather than the film being stretched.

Consequently, the film is not stretched or strained as much as it would have been if it were a coherent body on the surface.

This susceptibility of the piezoelectric film construction to crazing results in the present invention tending to be limited to measurement of strains of $10^{-4}$ in./in. (or m/m) or less. Beyond that point the piezoelectric film construction tends to be unreliable.

However the susceptibility of the piezoelectric film construction to crazing can be used to advantage in a non-destructive continuous monitoring technique with appropriate instrumentation. For example, the film is deposited in the region of a notch on a sample, or a piece of machinery. When the level of voltage response to a known loading markedly drops, then it follows that the material has been taken beyond its yield point in that region. This implies, in metallurgical terms, that the material can be on the point of failure in that region. Consequently, sudden and marked changes in the voltage response from an area around the notch can give a warning signal to the effect that there is a danger of failure of the machinery or component involved. Such failures are often associated with: (i) stress concentrations around notches which lead to cracking, (ii) cracks developing around welds, or (iii) fatigue. For example, in the case of steels at room temperature it is normal for the surface to rumple ahead of an advancing crack. Fatigue is characterized by slip lines intersecting the surface. In both instances the surface is locally deformed. A piezoelectric film placed adjacent to a potential failure point, such as a notch or a weld area, would craze if either mode of deformation were operating. Consequently it is possible to monitor an in-service machine for potential failure in a very simple way.

Such an application of the present invention is ideal for room temperature use, since ZnO films can be sputtered onto a (polished) surface and no prior crazing due to relative thermal expansion will take place. However the device is not limited to room temperature components. ZnS films 1 micron thick can be used in the range 0° to 180°C on Mo and clearly on metals of a lower coefficient of expansion. AlN, which is vapor deposited at 800°C, can be used for higher temperature ranges. In each potential application, the metal and its operating temperature must be considered in order to select the best piezoelectric film and the correct thickness to produce a non-crazed film.

Since the time response of piezoelectric films is in the megahertz range, and it has been shown that they can response accurately to very slow strain rates, and since also they can record strains up to $10^{116}$ $^4$ in./in. (or m/m), it follows that the piezoelectric film construction is ideal for acoustic emission monitoring. It has a distinct advantage over the standard transducer-oil coupled monitoring arrangements which may have frequency responses set by the thickness of oil coupling. Noise over the 5 megahertz range is very rapidly attenuated in most metals. By suitable signal filtering and amplification, these signals may be monitored with piezoelectric films.

We claim as our invention:

1. Signal generating apparatus responsive to strain in a given region of a body member, said apparatus comprising:
    a. a body member having a substrate surface formed along the exterior thereof in the region from which a signal is desired,
    b. a piezoelectric film affixed upon said substrate surface, said piezoelectric film being made of a crystalline material having a predetermined crystal lattice structure characteristic,
    c. output signal coupling means for direct coupling of an electrical signal generated by the piezoelectrically active properties of said piezoelectric film between selected spatially separated portions of said piezoelectric film,
    d. said output signal coupling means comprising an arrangement of first and second electrodes in spaced relationship in the thickness dimension the the piezoelectric film,
    e. said body member being made of a conductor material and forming said first electrode,
    f. a conductor disposed adjacent to and in signal coupling relationship to the outer face of the piezoelectric film, said conductor forming said second electrode,
    g. insulating film means cooperative with said piezoelectric film to obviate possible short circuit effects between the conductor and the body member which may be caused by portions of said conductor extending into minute vacancies which may be present as imperfections in the piezoelectric film,
    h. said insulating film means comprising an insulating film interposed between the outer face of the piezoelectric film and the adjacent conductor, and
    i. the thickness of said piezoelectric film being no greater than 1.5 microns and the thickness of said insulating film being of no more than about 500 Angstroms.

2. Signal generating apparatus responsive to strain in a given region of a body member, said apparatus comprising:
    a. a body member having a substrate surface formed along the exterior thereof in the region from which a signal is desired,
    b. a piezoelectric film affixed to said substrate surface, said piezoelectric film being made of a crystalline material having a predetermined crystal lattice structure characteristic,
    c. output signal coupling means for direct coupling of an electric signal generated by the piezoelectrically active properties of said piezoelectric film between selected spatially separated portions of said piezoelectric film,
    d. said output signal coupling means comprising an arrangement of first and second electrodes in spaced relationship in the thickness dimension of the piezoelectric film,
    e. said body member being made of a conductor material and forming said first electrode,
    f. a conductor disposed adjacent to and in signal coupling relationship to the outer face of the piezoelectric film, said conductor forming said second electrode,
    g. insulating film means cooperative with said piezoelectric film to obviate possible short circuit effects between the conductor and the body member which may be caused by portions of said conductor extending into minute vacancies which may be present as imperfections in the piezoelectric film,
    h. said insulating film means comprising an insulating film interposed between the substrate surface of the body member and the piezoelectric film, and
    i. the thickness of said piezoelectric film being no greater than 1.5 microns and the thickness of said insulating film being of no more than about 500 Angstroms.

3. Signal generating apparatus responsive to strains occurring in a given region of a body member, said apparatus comprising:
   a. a body member of a conductive material having a zone of its exterior surface adapted to receive in molecularly bonded relationship thereto a deposit of a different solid-state material, said zone adjoining the region of the body member from which a signal responsive to strain is desired,
   b. a dual layered arrrangement of solid-state films affixed to the body member on said zone prepared for receiving solid-state material, said dual layered arrangement comprising an inner film layer made of insulator material and an outer film layer made of piezoelectric material,
   c. said inner insulator film layer being deposited onto the body member by a vapor deposit-type process to effect the formation of the inner insulator film layer as a stratum of solid-state material in molecularly bonded relationship to the body member,
   d. said outer piezoelectric film layer being deposited onto the outer surface of the inner insulator film layer by a vapor deposit-type process to effect the formation of the outer piezoelectric film layer as a stratum of crystalline piezoelectric material in molecularly bonded relationship to the inner insulator film layer,
   e. a pair of electrodes comprising said body member forming one electrode of the pair and a conductor element affixed to the outer surface of said outer piezoelectric film layer forming the other electrode, said pair of electrodes being operative to pick off an electrical potential generated by the portion of the outer piezoelectric film layer disposed therebetween, and
   f. said inner insulator film layer sealing minute vacancies which may be present as imperfections in said outer piezoelectric film layer to obviate presence of a low impedance electrical path between the body member and the conductor element, whereby said dual layered arrangement composed of said inner and outer film layers constitutes a high internal impedance source of piezoelectric signals.

4. Apparatus in accordance with claim 3, wherein: said insulator material out of which said inner insulator film layer is made is characterized by a hardness in the upper half of the mho scale.

5. Signal generating apparatus responsive to strains occurring in a given region of a body member, said apparatus comprising:
   a. a body member of a conductive material having a zone of its exterior surface adapted to receive in molecularly bonded relationship thereto a deposit of a different solid-state material, said zone adjoining the region of the body member from which a signal responsive to strain is desired,
   b. a dual layered arrangement of solid-state films affixed to the body member on said zone prepared for receiving solid-state material, said dual layered arrangement comprising an inner film layer made of insulator material and an outer film layer made of piezoelectric material,
   c. said inner insulator film layer being deposited onto the body member by a vapor deposit-type process to effect the formation of the inner insulator film layer as a stratum of solid-state material in molecularly bonded relationship to the body member,
   d. said outer piezoelectric film layer being deposited onto the outer face of the inner insulator film layer by a sputtering-type process to effect the formation of the outer piezoelectric film layer as a stratum of crystalline piezoelectric material in molecularly bonded relationship to the inner insulator film layer,
   e. a pair of electrodes comprising said body member forming one electrode of the pair and a conductor element affixed to the outer surface of said outer piezoelectric film layer forming the other electrode, said pair of electrodes being operative to pick off an electrical potential generated by the portion of the outer piezoelectric film layer disposed therebetween, and
   f. said inner insulator film layer sealing minute vacancies which may be present as imperfections in said outer piezoelectric film layer to obviate presence of a low impedance electrical path between the body member and the conductor element, whereby said dual layered arrangement composed of said inner and outer film layers constitutes a high internal impedance source of piezoelectric signals.

6. Apparatus in accordance with claim 5, wherein:
   a. said insulator material out of which said inner insulator film layer is made is characterized by a hardness in the upper half of the mho scale.

7. Signal generating apparatus responsive to strains occurring in a given region of a body member, said apparatus comprising:
   a. a body member of a conductive material having a zone of its exterior surface adapted to receive in molecularly bonded relationship thereto a deposit of a different solid-state material, said zone adjoining the region of the body member from which a signal responsive to strain is desired,
   b. a dual layered arrangement of solid-state films affixed to the body member on said zone prepared for receiving solid-state material, said dual layered arrangement comprising an inner film layer made of insulator material and an outer film layer made of piezoelectric material,
   c. said inner insulator film layer deposited onto the body member by a sputtering-type process to effect the formation of the inner insulator film layer as a stratum of solid-state material in molecularly bonded relationship to the body member,
   d. said outer piezoelectric film layer being deposited onto the outer face of the inner insulator film layer by a sputtering-type process to effect the formation of the outer piezoelectric film layer as a stratum of crystalline piezoelectric material in molecularly bonded relationship to the inner surface insulator film layer,
   e. a pair of electrodes comprising said body member forming one electrode of the pair and a conductor element affixed to the outer surface of said outer piezoelectric film layer forming the other electrode, said pair of electrodes being operative to pick off an electrical potential generated by the portion of the outer piezoelectric film layer disposed therebetween, and
   f. said inner insulator film layer sealing minute vacancies which may be present as imperfections in said outer piezoelectric film layer to obviate presence of a low impedance electrical path between the body member and the conductor element, whereby said dual layered arrangement composed of said inner and outer film layers constitutes a high internal impedance source of piezoelectric signals.

8. Apparatus in accordance with claim 7, wherein:
   a. said insulator material out of which said inner insulator film layer is made is characterized by a hardness in the upper half of the mho scale.

9. Signal generating apparatus responsive to strains occurring in a given region of a body member, said apparatus comprising:
   a. a body member of a conductive material having a zone of its exterior surface adapted to receive in molecularly bonded relationship thereto a deposit of a different solid-state material, said zone adjoining the region of the body member from which a signal responsive to strain is desired,
   b. a dual layered arrangement of solid-state films affixed to the body member on said zone prepared for receiving solid-state material, said dual layered arrangement comprising an inner film layer made of insulator material and an outer film layer made of piezoelectric material,
   c. said inner insulator film layer being deposited onto the body member by a sputtering-type process to effect the formation of the inner insulator film layer as a stratum of solid-state material in molecularly bonded relationship to the body member,
   d. said outer piezoelectric film layer being deposited onto the outer face of the inner insulator film layer by a vapor deposit-type process to effect the formation of the outer piezoelectric film layer as a stratum of crystalline piezoelectric material in molecularly bonded relationship to the inner insulator film layer,
   e. a pair of electrodes comprising said body member forming one electrode of the pair and a conductor element affixed to the outer surface of said outer piezoelectric film layer forming the other electrode, said pair of electrodes being operative to pick off an electrical potential generated by the portion of the outer piezoelectric tric film layer disposed therebetween, and
   f. said inner insulator film layer sealing minute vacancies which may be present as imperfections in said outer piezoelectric film layer to obviate presence of a low impedance electrical path between the body member and the conductor element, whereby said dual layered arrangement composed of said inner and outer film layers constitutes a high internal impedance source of piezoelectric signals.

10. Apparatus in accordance with claim 9, wherein:
    a. said insulator material out of which said inner insulator film layer is made is characterized by a hardness in the upper half of the mho scale.

11. Signal generating apparatus responsive to strains occurring in a given region of a body member, said apparatus comprising:
    a. a body member of a conductive material having a zone of its exterior surface adapted to receive in molecularly bonded relationship thereto a deposit of a different solid-state material, said zone adjoining the region of the body member from which a signal responsive to strain is desired,
    b. a dual layered arrangement of solid-state films affixed to the body member on said zone prepared for receiving solid-state material, said dual layered arrangement comprising an inner film layer made of crystalline piezoelectric material and an outer film layer made of insulator material,
    c. said inner piezoelectric film layer being deposited onto the body member by a vapor deposit-type process to effect the formation of the inner piezoelectric film layer as a stratum of crystalline piezoelectric material in molecularly bonded relationship to the body member,
    d. said outer insulator film layer being deposited onto the outer face of the inner piezoelectric film layer by a vapor deposit-type process to effect the formation of the outer insulator film layer as a stratum of solid-state material in molecularly bonded relationship to said inner piezoelectric film layer,
    e. a pair of electrodes comprising said body member forming one electrode of the pair and a conductor element affixed to the outer surface of said outer insulator film layer forming the other electrode, said pair of electrodes being operative to pick off an electrical potential generated by the portion of the inner piezoelectric film layer disposed therebetween, and
    f. said outer insulator film layer sealing minute vacancies which may be present as imperfections in said inner piezoelectric film layer to obviate presence of a low impedance electrical path between the body member and the conductor element, whereby said dual layered arrangement composed of said inner and outer film layers constitutes a high internal impedance source of piezoelectric signals.

12. Signal generating apparatus responsive to strains occurring in a given region of a body member, said apparatus comprising:
    a. a body member of a conductive material having a zone of its exterior surface adapted to receive in molecularly bonded relationship thereto a deposit of a different solid-state material, said zone adjoing the region of the body member from which a signal responsive to strain is desired,
    b. a dual layered arrangement of solid-state films affixed to the body member on said zone prepared for receiving solid-state material, said dual layered arrangement comprising an inner film layer made of crystalline piezoelectric material and an outer film layer made of insulator material,
    c. said inner piezoelectric film layer being deposited onto the body member by a vapor deposit-type process to effect the formation of the inner piezoelectric film layer as a stratum of crystalline piezoelectric material in molecularly bonded relationship to the body member,
    d. said outer insulator layer being deposited onto the outer face of the inner piezoelectric film layer by a sputtering-type process to effect the formation of the outer insulator film layer as a stratum of solid-state material in molecularly bonded relationship to said inner piezoelectric film layer,
    e. a pair of electrodes comprising said body member forming one electrode of the pair and a conductor element affixed to the outer surface of said outer insulator film layer forming the other electrode, said pair of electrodes being operative to pick off an electrical potential generated by the portion of the inner piezoelectric film layer disposed therebetween, and
    f. said outer insulator film layer sealing minute vacancies which may be present as imperfections in said inner piezoelectric film layer to obviate presence of a low impedance electrical path between the body member and the conductor element, whereby said dual layered arrangement composed of said inner and outer film layers constitutes a high internal impedance source of piezoelectric signals.

13. Signal generating apparatus responsive to strains occurring in a given region of a body member, said apparatus comprising:
   a. a body member of a conductive material having a zone of its exterior surface adapted to receive in molecularly bonded relationship thereto a deposit of a different solid-state material, said zone adjoining the region of the body member from which a signal responsive to strain is desired,
   b. a dual layered arrangement of solid-state films affixed to the body member on said zone prepared for receiving solid-state material, said dual layered arrangement comprising an inner film layer made of crystalline piezoelectric material and an outer film layer made of insulator material,
   c. said inner piezoelectric film layer being deposited onto the body member by a sputtering-type process to effect the formation of the inner piezoelectric film layer as a stratum of crystalline piezoelectric material in molecularly bonded relationship to the body member,
   d. said outer insulator layer being deposited onto the outer face of the inner piezoelectric film layer by a sputtering-type process to effect the formation of the outer insulator layer as a stratum of solid-state material in molecularly bonded relationship to said inner piezoelectric film layer,
   e. a pair of electrodes comprising said body member forming one electrode of the pair and a conductor element affixed to the outer surface of said outer insulator film layer forming the other electrode, said pair of electrodes being operative to pick off an electrical potential generated by the portion of the inner piezoelectric film layer disposed therebetween, and
   f. said outer insulator film layer sealing minute vacancies which may be present as imperfections in said inner piezoelectric film layer to obviate presence of a low impedance electrical path between the body member and the conductor element, whereby said dual layered arrangement composed of said inner and outer film layers constitutes a high internal impedance source of piezoelectric signals.

14. Signal generating apparatus responsive to strains occurring in a given region of a body member, said apparatus comprising:
   a. a body member of a conductive material having a zone of its exterior surface adapted to receive in molecularly bonded relationship thereto a deposit of a different solid-state material, said zone adjoining the region of the body member from which a signal responsive to strain is desired,
   b. a dual layered arrangement of soid-state films affixed to the body member on said zone prepared for receiving solid-state material, said dual layered arrangement comprising an inner film layer made of crystalline piezoelectric material and an outer film layer made of insulator material,
   c. said inner piezoelectric film layer being deposited onto the body member by a sputtering-type process to effect the formation of the inner piezoelectric film layer as a stratum of crystalline piezoelectric material in molecularly bonded relationship to the body member,
   d. said outer insulator film layer being deposited onto the outer face of the inner piezoelectric film layer by a vapor deposit-type process to effect the formation of the outer insulator film layer as a stratum of solid-state material in molecularly bonded relationship to said inner piezoelectric film layer,
   e. a pair of electrodes comprising said body member forming one electrode of the pair and a conductor element affixed to the outer surface of said outer insulator film layer forming the other electrode, said pair of electrodes being operative to pick off an electrical potential generated by the portion of the inner piezoelectric film layer disposed therebetween, and
   f. said outer insulator film layer sealing minute vacancies which may be present as imperfections in said inner piezoelectric film layer to obviate presence of a low impedance electrical path between the body member and the conductor element, whereby said dual layered arrangement composed of said inner and outer film layers constitutes a high internal impedance source of piezoelectric signals.

15. Signal generating apparatus responsive to strains occurring in a given region of a body member, and further of a type adapted to be responsive to a shear wave mode strain having a component acting in a direction parallel to the exterior surface of the body member, said apparatus comprising:
   a. a body member have a substrate surface formed along said exterior surface in said given region at which response to said shear wave mode of strain is desired,
   b. a piezoelectric film affixed to said substrate surface, said piezoelectric film being of a crystalline material having a predetermined crystal lattice structure characteristic so chosen to generate a piezoelectric signal between positions thereof which are spaced in a direction parallel to the plane of the film in response to shear wave mode of strain having a component acting in a direction parallel to the plane of the film,
   c. an insulator film disposed over the outer face of said piezoelectric film,
   d. first and second electrodes comprising first and second conductors disposed contiguous to the outer face of said insulator film, said first and second conductors being spaced apart in a direction parallel to the plane of the film,
   e. said insulating film being cooperative with said piezoelectric film to obviate possible short circuit effects between either of the conductors and the body member which may be caused by portions of a conductor extending into minute vacancies which may be present as imperfections in the piezoelectric film, and
   f. the thickness of said piezoelectric film being no greater than 1.5 microns and the thickness of said insulating film being no more than about 500 Angstroms.

16. Signal generating apparatus responsive to strains occurring in a given region of a body member, and further of a type adapted to be responsive to a shear wave mode of strain having a component acting in a direction parallel to the exterior surface of the body member, said apparatus comprising:

a. a body member of a conductive material having a zone of its exterior surface adapted to receive in molecularly bonded relationship thereto a deposit of a different solid-state material, said zone adjoining the region of the body member from which a signal responsive to shear wave mode of strain is desired, b. a dual layered arrangement of solid-state films affixed to the body member on said zone prepared for receiving solid-state material, said dual layered arrangement comprising an inner film layer made of crystalline piezoelectric material and an outer film layer made of insulator material, c. said inner piezoelectric film layer being deposited onto the body member by a vapor deposit-type process to effect the formation of the inner piezoelectric film layer as a stratum of crystalline piezoelectric material in molecularly bonded relationship to the body member, d. said outer insulator film layer being deposited onto the outer face of the inner piezoelectric film layer by a vapor deposit-type process to effect the formation of the outer film layer as a stratum of solid-state material in molecularly bonded relationship to said inner piezoelectric film layer, e. first and second electrodes spaced in a direction parallel to the plane of the film layer and each being electrically coupled to the outer face of the outer insulator film layer, f. said crystalline piezoelectric material of which the inner piezoelectric film layer is made having a predetermined crystal lattice structure characteristic so chosen to generate a piezoelectric signal between positions therein spaced apart in a direction parallel to the plane of the film layer in response to a sheave wave mode of strain having a component acting in a direction parallel to the plane of the film layer, and g. said outer insulator film layer sealing minute vacancies which may be present as imperfections in said inner piezoelectric film to obviate presence of a low impedance electrical path between either of the electrodes and the body member, whereby said dual layered arrangement composed of said inner and outer film layers constitutes a high internal impedance source of piezoelectric signals for purposes of coupling the signal generated within the inner piezoelectric film layer between the positions therein adjacent to the first and second electrodes into such electrodes.

17. Signal generating apparatus responsive to strains occurring in a given region of a body member, and further of a type adapted to be responsive to a shear wave mode of strain having a component acting in a direction parallel to the exterior surface of the body member, said apparatus comprising:

a. a body member of a conductive material having a zone of its exterior surface adapted to receive in molecularly bonded relationship thereto a deposit of a different solid-state material, said zone adjoining the region of the body member from which a signal responsive to shear wave mode of strain is desired, b. a dual layered arrangement of solid-state films affixed to the body member on said zone prepared for receiving solid-state material, said dual layered arrangement comprising an inner film layer made of crystalline piezoelectric material and an outer film layer made of insulator material, c. said inner piezoelectric film layer being deposited onto the body member by a vapor deposit-type process to effect the formation of the inner piezoelectric film layer as a stratum of crystalline piezoelectric material in molecularly bonded relationship to the body member, d. said outer insulator layer being deposited onto the outer face of the inner piezoelectirc film layer by a sputtering-type process to effect the formation of the outer insulator film layer as a stratum of solid-state material in molecularly bonded relationship to said inner piezoelectric film layer, e. first and second electrodes spaced in a direction parallel to the plane of the film layer and each being electrically coupled to the outer face of the outer insulator film layer, f. said crystalline piezoelectric material of which the inner piezoelectric film layer is made having a predetermined crystal lattice structure characteristic so chosen to generate a piezoelectric signal between positions therein spaced apart in a direction parallel to the plane of the film layer in response to a shear wave mode of strain having a component acting in a direction parallel to the plane of the film layer, and g. said outer insulator film layer sealing minute vacancies which may be present as imperfections in said inner piezoelectric film to obviate presence of a low impedance electrical path between either of the electrodes and the body member, whereby said dual layered arrangement composed of said inner and outer film layers constitutes a high internal impedance source of piezoelectric signals for purposes of coupling the signal generated within the inner piezoelectric film layer between the positions therein adjacent to the first and second electrodes into such electrodes.

18. Signal generating apparatus responsive to strains occurring in a given region of a body member, and further of a type adapted to be responsive to a shear wave mode of strain having a component acting in a direction parallel to the exterior surface of the body member, said apparatus comprising:

a. a body member of a conductive material having a zone of its exterior surface adapted to receive in molecularly bonded relationship thereto a deposit of a different solid-state material, said zone adjoining the region of the body member from which a signal responsive to shear wave mode of strain is desired, b. a dual layered arrangement of solid-state films affixed to the body member on said zone prepared for receiving solid-state material, said dual layered arrangement comprising an inner film layer made of crystalline piezoelectric material and an outer film layer made of insulator material, c. said inner piezoelectric film layer being deposited onto the body member by a sputtering-type process to effect the formation of the inner piezoelectric film layer as a stratum of crystalline piezoelectric material in molecularly bonded relationship to the body member, d. said outer insulator layer being deposited onto the outer face of the inner piezoelectric film layer by a sputtering-type process to effect the formation of the outer insulator film layer as a stratum of solid-state material in molecularly bonded relationship to said inner piezoelectric film layer, e. first and second electrodes spaced in a direction parallel to the plane of the film layer and each being electrically coupled to the outer face of the outer insulator film layer, f. said crystalline piezoelectric material of which the inner piezoelectric film layer is made having a predetermined crystal lattice structure characteristic so chosen to generate a piezoelectric signal between positions therein spaced apart in a direction parallel to the plane of the film layer in response to a shear wave mode of strain having a component acting in a direction parallel to the plane of the film layer, and g. said outer insulator film layer sealing minute vacancies which may be present as imperfections in said inner piezoelectric film to obviate presence of a low impedance electrical path between either of the electrodes and the body member, whereby said dual layered arrangement composed of said inner and outer film layers constitutes a high internal impedance source of piezoelectric signals for purposes of coupling the signal generated within the inner piezoelectric film layer between the positions therein adjacent to the first and second electrodes into such electrodes.

19. Signal generating apparatus responsive to strains occurring in a given region of a body member, and further of a type adapted to be responsive to a shear wave mode of strain having a component acting in a direction parallel to the exterior surface of the body member, said apparatus comprising:

a. a body member of a conductive material having a zone of its exterior surface adapted to receive in molecularly bonded relationship thereto a deposit of a different solid-state material, said zone adjoining the region of the body member from which a signal responsive to shear wave mode of strain is desired, b. a dual layered arrangement of solid-state films affixed to the body member on said zone prepared for receiving solid-state material, said dual layered arrangement comprising an inner film layer made of crystalline piezoelectric material and an outer film layer made of insulator material, c. said inner piezoelectric film layer being deposited onto the body member by a sputtering-type process to effect the formation of the inner piezoelectric film layer as a stratum of crystalline piezoelectric material in molecularly bonded relationship to the body member, d. said outer insulator film layer being deposited onto the outer face of the inner piezoelectric film layer by a vapor deposit-type process to effect the formation of the outer insulator film layer as a stratum of solid-state material in molecularly bonded relationship to said inner piezoelectric film layer, e. first and second electrodes spaced in a direction parallel to the plane of the film layer and each being electrically coupled to the outer face of the outer insulator film layer, f. said crystalline piezoelectric material of which the inner piezoelectric film layer is made having a predetermined crystal lattice structure characteristic so chosen to generate a piezoelectric signal between positions therein spaced apart in a direction parallel to the plane of the film layer in response to a shear wave mode of strain having a component acting in a direction parallel to the plane of the film layer, and g. said outer insulator film layer sealing minute vacancies which may be present as imperfections in said inner piezoelectric film to obviate presence of a low impedance electrical path between either of the electrodes and the body member, whereby said dual layered arrangement composed of said inner and outer film layers constitutes a high internal impedance source of piezoelectric signals for purposes of coupling the signal generated within the inner piezoelectric film layer between the positions therein adjacent to the first and second electrodes into such electrodes.

* * * * *